United States Patent
Pedersen et al.

(10) Patent No.: US 8,885,361 B2
(45) Date of Patent: Nov. 11, 2014

(54) LOW POWER SWITCH MODE POWER SUPPLY

(75) Inventors: Rene Ingemann Pedersen, Odder (DK); Jan Knudsen, Østbirk (DK)

(73) Assignee: ZZzero ApS, Arhus (DK)

( * ) Notice: Subject to any disclaimer, the term of this patent is extended or adjusted under 35 U.S.C. 154(b) by 141 days.

(21) Appl. No.: 13/372,551

(22) Filed: Feb. 14, 2012

(65) Prior Publication Data

US 2012/0212978 A1    Aug. 23, 2012

Related U.S. Application Data

(63) Continuation-in-part of application No. PCT/DK2010/050205, filed on Aug. 10, 2010.

(30) Foreign Application Priority Data

Aug. 14, 2009   (DK) ................................ 2009 00930

(51) Int. Cl.
*H02M 3/335* (2006.01)
*H02M 3/338* (2006.01)
*H02M 1/00* (2006.01)

(52) U.S. Cl.
CPC .. *H02M 3/33553* (2013.01); *H02M 2001/0032* (2013.01); *Y02B 70/16* (2013.01); *H02M 3/3385* (2013.01)
USPC .................................. 363/21.07; 363/21.04

(58) Field of Classification Search
USPC ........ 363/19, 18, 15, 37, 21.01, 21.04, 21.07, 363/21.12, 21.15
See application file for complete search history.

(56) References Cited

U.S. PATENT DOCUMENTS

| | | | | |
|---|---|---|---|---|
| 4,443,838 A | * | 4/1984 | Yamada | 363/19 |
| 4,654,771 A | * | 3/1987 | Stasch et al. | 363/19 |
| 4,737,898 A | * | 4/1988 | Banfalvi | 363/19 |

(Continued)

FOREIGN PATENT DOCUMENTS

| | | |
|---|---|---|
| DE | 4438388 | 5/1996 |
| DE | 4438388 A1 * | 5/1996 |

(Continued)

OTHER PUBLICATIONS

DE 4438388 A1—Machine Translation.*

(Continued)

*Primary Examiner* — Timothy J Dole
*Assistant Examiner* — Shahzeb K Ahmad
(74) *Attorney, Agent, or Firm* — 24IP Law Group; Timothy R DeWitt

(57) ABSTRACT

A device and a method for operating a low power switch mode power supply, where DC input power is converted to AC power by an oscillator, which AC power is transformed to an AC voltage and AC current, which output power is converted into DC power, where the DC voltage is used as a feedback signal for controlling the oscillator. It is the objective of the invention to reduce a standby power consumption of power consuming devices. The oscillator comprises a first and a second current loop, which first current loop generates an activation current for the second current loop, where the primary coil of a transformer is part of the second current loop, and where the second loop comprises a current/voltage measuring system and generates increasing current in the second current loop and closes the current flow in the second current loop.

8 Claims, 8 Drawing Sheets

(56) References Cited

U.S. PATENT DOCUMENTS

| | | | |
|---|---|---|---|
| 6,956,761 B2 * | 10/2005 | Campbell | 365/151 |
| 2003/0030422 A1 * | 2/2003 | Sula | 323/288 |
| 2008/0205102 A1 | 8/2008 | Makino | |

FOREIGN PATENT DOCUMENTS

| | | |
|---|---|---|
| EP | 0 525 920 A1 | 6/1992 |
| EP | 1798845 | 6/2007 |
| JP | 2002244743 * | 8/2002 |
| WO | 2008/145511 A1 | 12/2008 |

OTHER PUBLICATIONS

JP 2002244743—Machine Translation.*

* cited by examiner

LOW POWER SWITCH MODE POWER SUPPLY

CROSS REFERENCE TO RELATED APPLICATIONS

This application is a continuation-in-part of PCT Application Serial No. PCT/DK2010/050205 filed on Aug. 10, 2010, and claiming priority of Danish Patent Application No. DK 2009 930 filed on Aug. 14, 2009. The aforementioned patent applications are hereby incorporated by reference in their entirety.

FIELD OF THE INVENTION

The present invention relates to a low power switch mode power supply comprising a primary oscillating circuit, which primary oscillating circuit is connected to a DC power source, which primary oscillating circuit is connected to a first primary coil of a transformer, which transformer comprises at least a first secondary coil, which secondary coil is connected through a rectifier to a output circuit, which output circuit comprises at least a first capacitor for forming a mostly DC output voltage, the switch mode power supply further comprises a feedback circuit, which feedback circuit uses the actual output voltage for control of the primary switching circuit.

The present invention also relates to a method for operating a low power switch mode power supply, where a mostly DC input power is converted to AC power by an oscillator, which AC power is transformed to a AC voltage and AC current, which output power is converted into DC power, where the output DC voltage is used as a feedback signal for controlling the oscillator.

BACKGROUND OF THE INVENTION

EP 1798845 A1 concerns a multi-output switched-mode power supply having an AC/DC converter with an AC input voltage at its input, a DC/AC converter and a transformer, which provides a Vac3 voltage at its output, which is coupled to a plurality of output blocks. Each output block consists of a switch, a filter and a controller. The switch of each output block has its input connected to the Vac3 voltage and provides at its output a rectified switch output voltage when turned on and high impedance when turned off. In turn, the filter of each output block has its input coupled to an output of the corresponding switch and provides at its output a smoother output voltage Vout1, Vout2, Voutn whereas the controller, which has its first input connected to the output voltage, its second input connected to a reference voltage, and its third input connected to the Vac3 voltage, provides at its output a switch control signal to the corresponding switch. The switch control signal turning the corresponding switch on is generated when the output voltage drops below the reference voltage and the Vac3 voltage is zero, and the switch control signal turning the corresponding switch off is generated when the output voltage increases above the reference voltage.

OBJECT OF THE INVENTION

It is the objective of the invention to reduce a standby power consumption of power consuming devices. A further object of the invention is to reduce a standby power consumption for protecting the global environment.

SUMMARY OF THE INVENTION

The objective of the invention can be fulfilled by the preamble of claim 1 if a feedback circuit comprises an opto coupler, which input LED of the opto coupler is connected through a current and voltage limiting circuit to the output voltage, which low power switch mode power supply comprises a first current loop in the form of a voltage divider, which voltage divider is connected to the DC power source through at least one large resistor, which large resistor is connected to a first terminal of a first transistor, which voltage divider is connected to a first terminal of a second transistor, which first terminal of the second transistor is connected to ground, which low power switch mode power supply further comprises a second current loop in the form of the primary coil of the transformer which first end is connected to the DC power source and the second end of the primary coil is connected to a second terminal of the first transistor, which second current loop further comprises a resistor, which resistor is connected to ground and the third terminal of the first transistor is further connected to an output transistor of the opto coupler.

Hereby it can be achieved that the oscillator is controlled by a feedback signal over the opto coupler dependent of the output voltage at the secondary side of the circuit. By controlling the oscillator on demand at the output, the number of oscillations can be limited to only one oscillation and then no activity for a relatively long time period. If no power is used at the secondary side of the switch mode transformer, maybe only one oscillation per second is performed. If there is any demand then more oscillations take place and even a relative high power demand can be achieved if the oscillator is operating continuously. By controlling the oscillation based on the actual output voltage it is possible to read a stand-by power consumption of this switch mode power supply that is nearly impossible to measure. The oscillator is operating in the way where the oscillation automatically stops after each single oscillation. Due to the start of the oscillation on demand then the single oscillation automatically stops when the current flowing in the transformer has reached a certain level. Thereby, it is achieved that the current flowing through the oscillator is very limited both in the actual flowing current when activated but also in that there is a long period between each single activation. The switch mode power supply can be designed in a way where there is a galvanic isolation between the input side and the output side. In that way, the input to the switch mode power supply could be a traditional connection to an AC grid with a voltage approximately 110-230 volts AC. Because a transformer is used for the power transmission and the feedback is performed by an opto coupler, it is possible to perform the galvanic isolation.

In an aspect of the invention the transformer can comprise a second primary coil, which coil is by one end connected to ground, and the second end of the coil is connected to the voltage divider of the first current loop. By using a second primary coil, it is possible to start the activation by a relative limited current and then let this limited current generate a weak current pulse in the second primary coil and use the energy of this pulse to increase the activation current for a transistor and then first afterwards increase the current up to a higher level. The circuit is constructed so that as soon as the current is increasing to a certain level, the circuit as such is closed. The use of the second primary coil also leads to a reduction in the time period in which current is flowing through the primary coil. Hereby it can be achieved that the power demand on the primary side is further reduced.

At least one of the transistors is a bipolar and/or a field-effect transistor. Especially in case a field-effect transistor, such as a metal-oxide-semiconductor field-effect transistor (MOSFET), is used as a first transistor, much faster switching times can be achieved. Additionally, the use of a field-effect transistor reduces the power losses within the low power switch mode power supply and withstands higher voltages compared to a bipolar transistor. The single switching sequence of the oscillator in standby situation is performed at a rate as long as once per second. Hereby is received that only once per second there is a power consumption, in the resting period current is only flowing through very large resistors. Therefore the power in the resting periods for the oscillator is as low as a few mW. Only in the short switching period is the power consumption higher. Therefore, the power consumption in standby condition can be reduced to less than 10 mW. Many electronic devices have standby power consumption above one W. A low power relay unit can receive power for operation from the low power switch mode power supply, which relay unit comprises a bi-stable relay, which bi-stable relay has a coil connected to a control circuit, which control circuit comprises a first and a second current loop, which first and second current loop each comprise two electronic switches for forming an electronic bridge, which coil of the relay unit is connected between the switches of the bridge, where at least one electronic switch is connected to a processor, which processor generates activation pulses for the electronic switches, which processor further in connected to an input device. Hereby it can be achieved that a bi-stable relay can be switched between two stable positions with a very low power demand. The bi-stable relay could be part of a power switch in any electric or electronic device. The relay unit could have switches that can be used by normal electric net connections with up to several amperes and a voltage up to 230 volts. If this unit has to be used with a much larger power demand, it is possible by using further a relay for switching e.g. a three-phase connection to an electronic or electric device. The combination of the switch mode power supply and the relay unit can lead to an extremely low standby power in all kinds of electric or electronic devices. Nearly all types of electric or electronic devices are today connected to the grid and have a standby power consumption that typically has a value of some W. The pending invention can be used in several ways but one way of using this invention is to build this invention into the electronic or electric devices as part of a power supply. Further possible use of this invention is the use of the switch mode power supply and the relay unit for the supply of a row of sockets which can be connected to electronic devices. All these devices can power up immediately, and in fact the relay unit can be coded in a way in where a normal infrared communication device is switching on the relay unit.

System for operating a low power switch mode power supply, whereby the low power switch mode power supply is used to supply a relay unit, which relay unit control the position of a bi-stable relay, which relay unit change the position of the bi stable relay based of an input signal. The use of the switch mode power supply together with the relay unit will in a standby situation be nearly no power consumption from the relay unit because the relay is bi-stable. Only a small processor is in operation in order to have the input device active. The power consumption in that circuit can be extremely low. The low power consumption can result in that the oscillator in the switch mode power supply is only switching perhaps once per second. Therefore, the power supply in a standby situation is so low that the actual power demand is reduced to a few mW. By use of this power supply and the relay unit activation by sending an input for the relay unit will only in a very short period give an increasing power demand because as soon as the relay unit is switched to the opposite position, the power consumption will again return to the very low state. Only in the very short time period, when the switching of the relay is performed, there will be a more or less continuous switching of the oscillator in the power supply. This continuous oscillation only takes place for a few milliseconds. Therefore, the power consumption spread over a period is extremely low and difficult to measure.

The relay unit can receive an input signal from a communication device. The communication device could be e.g. an infrared communication device used for controlling a television. The communication device could be designed so that a number of different input commands to the infrared communication device all will result in a power on of the device. One disadvantage by using this invention could be that it will be necessary to at first switch on the power supply and then as the next give further one command before the television switches on.

The power supply and the relay unit can be art of the power supply in a power consuming device. Hereby can be achieved that the standby power supply e.g. in a washing machine or dishwasher can be reduced to a very low level. Also in many computer devices there is relatively high power consumption when these computer systems are in a standby situation. The system for operating a low power switch mode power supply of this invention can reduce this power consumption in the standby situation to a power consumption that is close to zero.

The objective of the invention can be fulfilled by the preamble to claim 5 if the oscillator comprises a first and a second current loop, which first current loop generates an activation current for a second current loop, where the primary coil of a transformer is part of the second current loop, where the second loop comprises a current/voltage measuring system and generates increasing current in the second current loop and closes the current flow in the second current loop. Hereby it can be achieved that the first current loop is generating the control signal for opening the second current loop if the signal is undisturbed from or to the opto coupler. In this way, the oscillator can start automatically because if no input signal occurs the current in the first loop will automatically open a transistor in the second loop. That will lead to build up a current during the second loop but there is a serial resistor which is connected to the base of the transistor in the first loop and increasing the current through that resistor will lead to increasing collector voltage in that transistor which is connected to the base of the transistor in the second loop which transistor is thereby closed. Hereby a very short pulse is generated. But this short pulse is transmitted over the transformer and is forming a current that is flowing to a diode onto an electrolytic capacitor where the output DC is generated. Hereby is achieved a very effective switch mode power supply for small power consumptions. According to a further aspect of the present invention a method for operating a low power switch mode power supply is disclosed and mostly DC input power is converted to AC output power by an oscillator, which AC power is transformed to an AC voltage and AC current, which AC output power is converted into DC power having an output DC voltage, where the output DC voltage is used as a feedback signal for controlling the oscillator, characterized in that the oscillator comprises a first current loop and a second current loop, where the primary coil of a transformer is part of the second current loop, where the second loop comprises a current/voltage measuring system and generates increasing current in the second current loop and closes the current flow in the second current loop.

Still other aspects, features, and advantages of the present invention are readily apparent from the following detailed description, simply by illustrating embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

DESCRIPTION OF THE DRAWINGS

For a more complete understanding of the present invention and the advantages thereof, reference is now made to the following description and the accompanying drawings, in which.

DETAILED DESCRIPTION OF THE INVENTION

Figure 1:
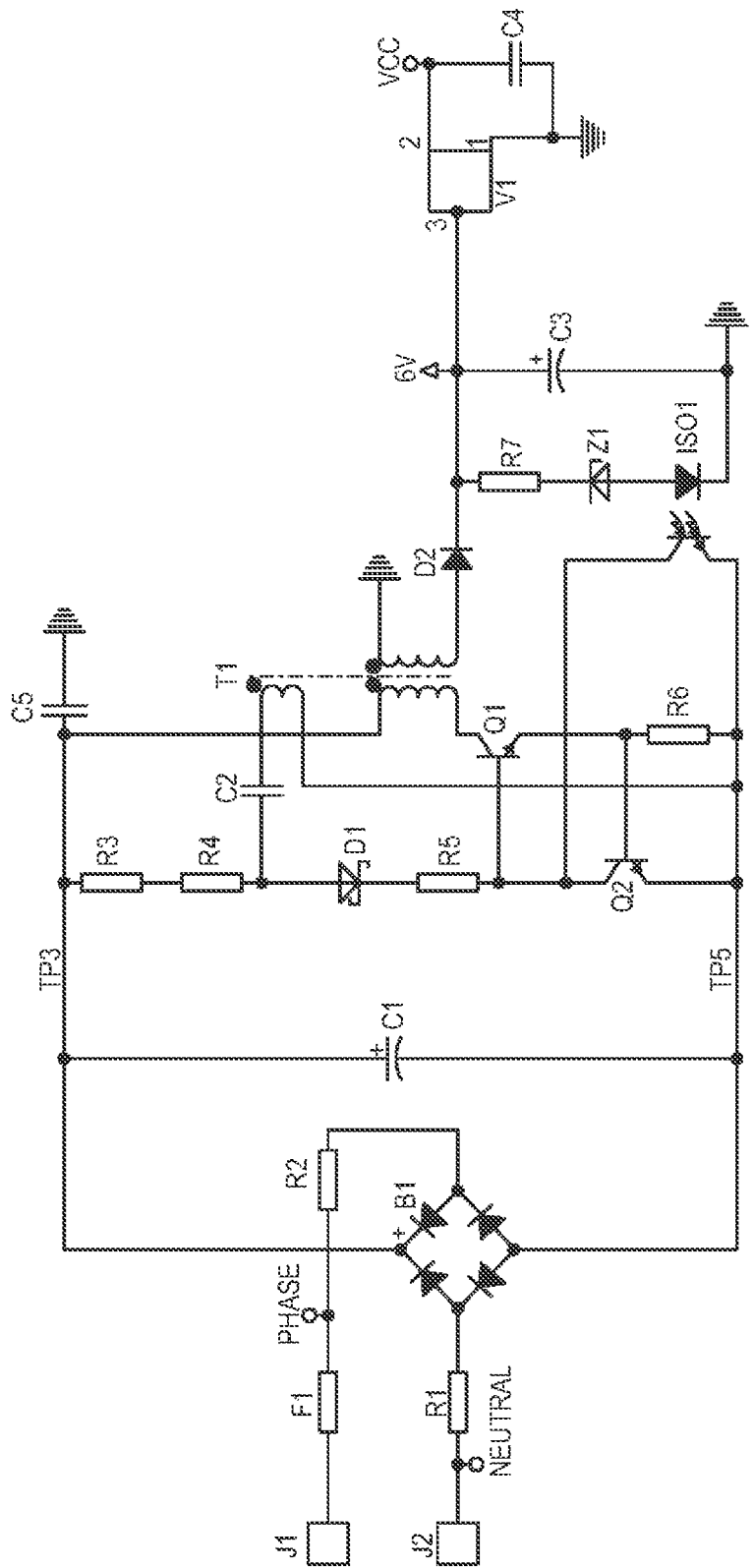
FIG. 1 shows a possible embodiment for a switch mode power supply.

FIG. 1 shows a possible embodiment for a switch mode power supply. An AC input having a voltage 80-230 volts is at first sent through fuses F1 and further through a resistor R2 to one of the input terminals of a diode bridge. The other input line is connected through a resistor R1 to the other side of the diode bridge. The output of the diode bridge is in one end forming a negative voltage and the other end forming a positive voltage. The capacitor C1 is connected between the positive and the negative part of the circuit for forming a mostly DC voltage. Starting from the positive terminal a first current loop 1 is formed by relatively big resistors R3 and R4. Furthermore, the first current loop contains a diode D1 and a resistor R5. Further is the first current loop connected to the collector of a second bipolar transistor Q2 where the emitter is further connected to the negative power terminal. Further is a second current loop starting from the positive terminal connected to the primary side of a transformer where this primary side on the opposite side of the coil is connected to the collector of the first bipolar transistor Q1. The emitter of the first bipolar transistor Q1 is connected through a resistor R6 to the negative terminal. The base of the first bipolar transistor Q1 is connected to the resistor R5 and the collector of the second bipolar transistor Q2. Further the base of the second bipolar transistor Q2 is connected to the emitter of the first bipolar transistor Q1 and to the resistor R6. The secondary side of the transformer is connected through a diode D2 to a capacitor C3. Furthermore the diode D2 is connected through a resistor R7 to a Zener diode Z1 to the transmitting part of an opto coupler ISO1. The receiving part of the opto coupler which is a photo transistor has its emitter connected to the negative voltage and the collector is connected to the first current loop between the collector of second bipolar transistor Q2 and the resistor R5 which is also the connection to the base of the first bipolar transistor Q1. The output is further connected to a regulation unit U1 which can perform a power regulation to a voltage which is reduced in the shown example to 6 volts.

In operation, there will be a continuous DC voltage at the positive side of the diode bridge. Therefore, a current is flowing through the first current loop to the R3 R4, the diode D1 and the resistor R5. Probably, the second bipolar transistor Q2 is in a closed situation. Therefore, a base current is generated for the first bipolar transistor Q1. But if the opto coupler is active because the current is flowing to the opto coupler no base current for the first bipolar transistor Q1 is generated. As soon as the opto coupler is no longer activated, the base current for the first bipolar transistor Q1 is generated and the first bipolar transistor Q1 starts opening and the current is flowing through the second current loop. The primary side of the transformer comprises a further coil 4, 5 which coil at one end is connected to the negative terminal and which other end through a capacitor C2 is connected to the second current loop. Hereby is a further opening current generated for the first bipolar transistor Q1, if the first bipolar transistor Q1 has started opening for current flowing through the second current loop. Hereby a two-step activation of the current through the transformer T1 can be achieved. As soon the current is starting to flow through the primary side of the transformer T1 and through the first bipolar transistor Q1, the resistor R6 has an increasing voltage which generates a base current at the second bipolar transistor Q2 which is then opened. Opening of the second bipolar transistor Q2 is also removing the base current from the first bipolar transistor Q1 which is then closed. Thereby, the current flowing through the resistor R6 is decreasing, and the base current for the second bipolar transistor Q2 decreases as the second b-polar transistor Q2 stops conducting. The switching as such stops after each single oscillation. Next oscillation starts only in a situation of low output voltage. As long as the output voltage is able to send a sufficient current through the Zener diode Z1 and the light emitting diode of the opto coupler ISO1 and hereby bring the transistor in the opto coupler to conduct. Hereby the base current of the first bipolar transistor Q1 is reduced, and the first bipolar transistor Q1 is not able to start conducting before the current in the opto coupler is stopped. Hereby is achieved a highly effective switch mode power supply.

Figure 2:
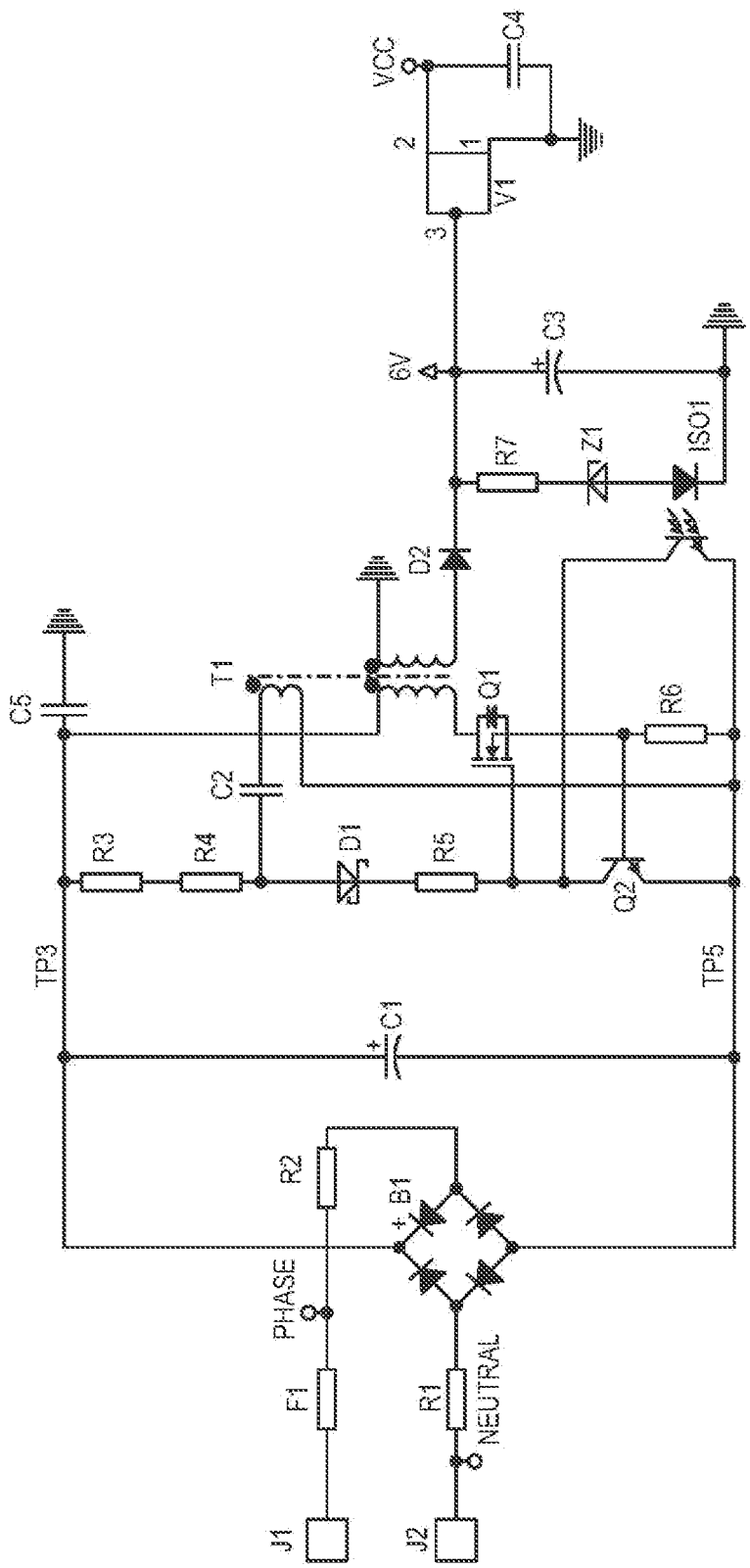
FIG. 2 shows a possible second embodiment for a switch mode power supply with a first field-effect transistor M1.

FIG. 2 shows a possible second embodiment for a switch mode power supply with a first field-effect transistor M1, for example a MOSFET. Compared with the embodiment of FIG. 1, the embodiment of FIG. 2 comprises a first current loop connected to the collector of the second bipolar transistor Q2 and the emitter is further connected to the negative power terminal. The second current loop starts from the positive terminal connected to the primary side of a transformer T1 and this primary side on the opposite side of the coil is connected to the source of the first field-effect transistor M1. The drain of the first field-effect transistor M1 is connected through a resistor R6 to the negative terminal. The gate of the first field-effect transistor M1 is connected to the resistor R5 and the collector of the second bipolar transistor Q2. Further the base of the second bipolar transistor Q2 is connected to the drain of the first field-effect transistor M1 and to the resistor R6. Additionally, the embodiment of FIG. 2 does not comprises two resistors R1,R2 in the input terminals of the diode bridge compared to embodiment FIG. 1, because the first field-effect transistor M1, especially in case of a MOSFET, can withstand higher voltages and therefore is no need to protect the circuit. Therefore there is no need to limit the voltage within the circuit.

Figure 3:
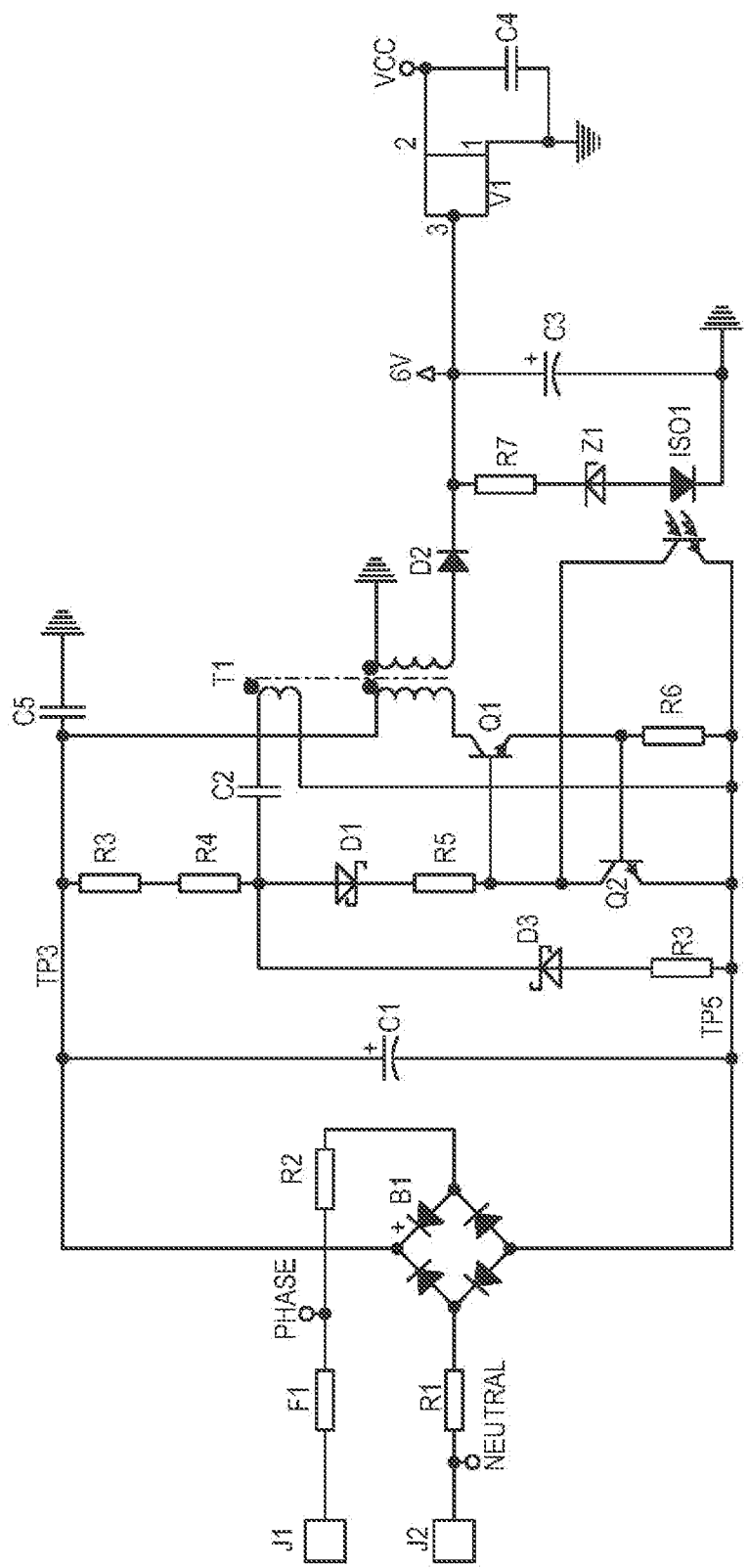
FIG. 3 shows a possible third embodiment for a switch mode power supply with an additional resistor and an additional diode.

FIG. 3 shows a possible third embodiment for a switch mode power supply with an additional resistor and an additional diode compared to the embodiment of FIG. 1. The embodiment of FIG. 3 ensures that the output current is increased, because the additional loop of the resistor R8 and diode D3 discharges the second capacitor C2 much faster compared to the circuit according to the embodiment of FIG. 1.

Figure 4:
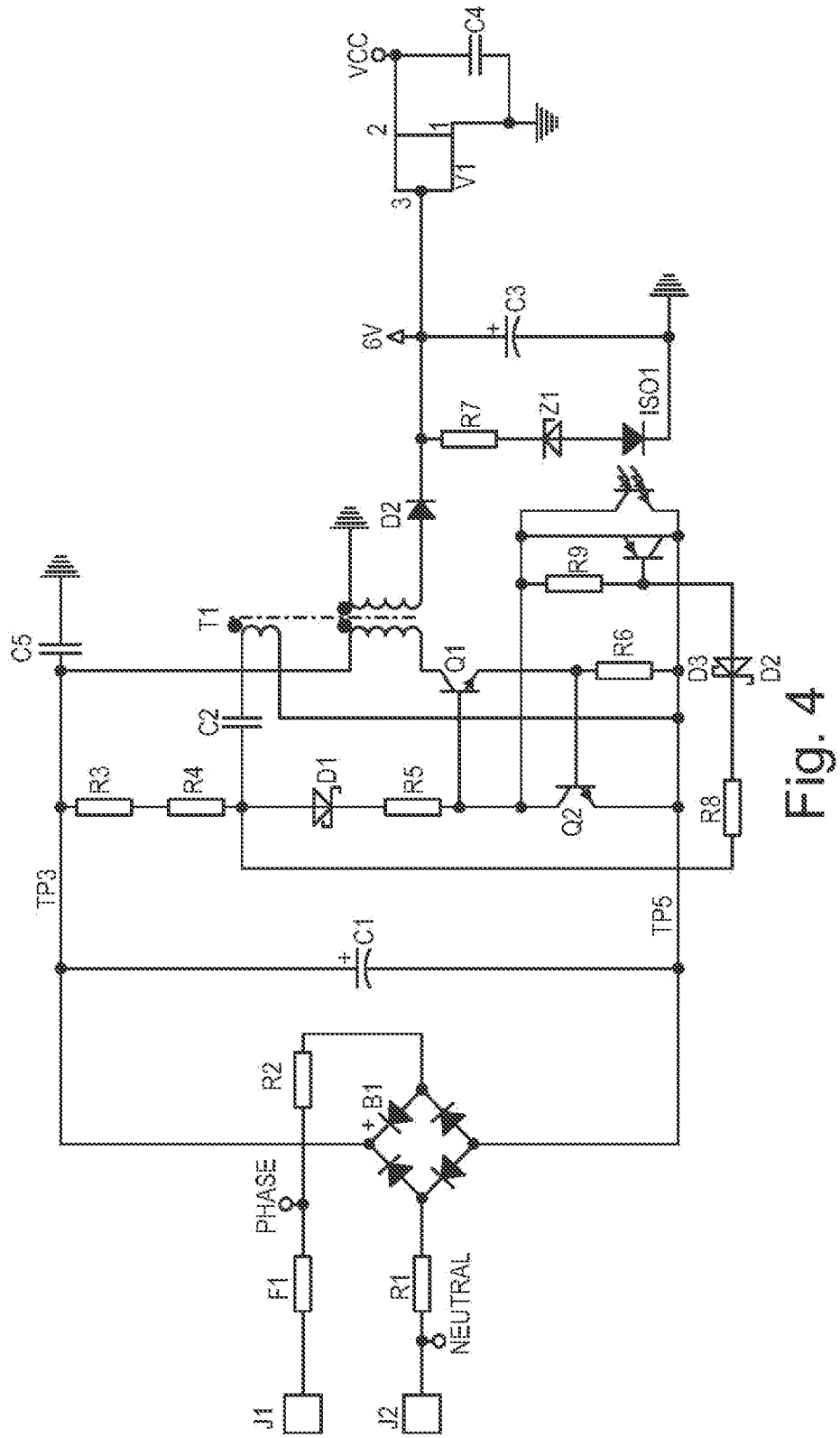
FIG. 4 shows a possible fourth embodiment for a switch mode power supply with an additional transistor.

FIG. 4 shows a possible fourth embodiment for a switch mode power supply with an additional third bipolar transistor Q3 compared to the embodiment of FIG. 1. The embodiment of FIG. 4 discloses the third bipolar transistor Q3 in the second loop. Additionally, the third bipolar transistor Q3 is connected with the first bipolar transistor Q1. In case of a negative current in the second loop the third field-effect transistor Q3 switches on and a short circuit is generated at the base and between the emitter of first bipolar transistor Q1. In this case, the first bipolar transistor Q1 turns off very quickly. Compared to the embodiment of FIG. 1, the embodiment of FIG. 4 has an improved efficiency and ensures faster switching times of the first bipolar transistor Q1.

Figure 5:
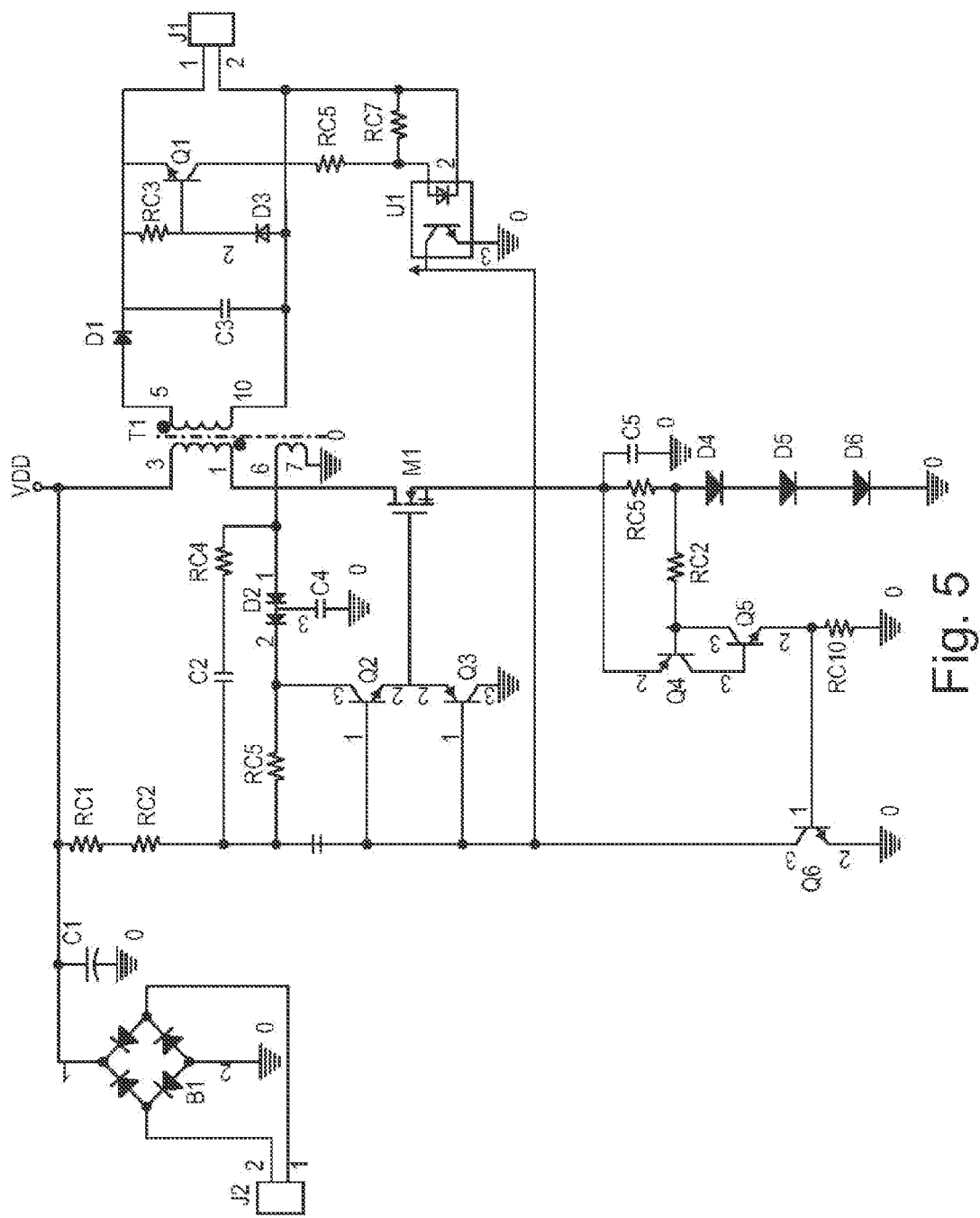
FIG. 5 shows a possible fifth embodiment for a switch mode power supply with a MOSFET field-effect transistor M1.

FIG. 5 shows a possible fifth embodiment for a switch mode power supply with an additional first field-effect transistor M1 compared to the embodiment of FIG. 1. The embodiment of FIG. 5 discloses a first field-effect transistor M1 in the second loop. The input voltage may be between 85-265 V AC and is transferred by the rectifier circuit into a DC voltage. A current is flowing through the resistors R1 and R2 and the base of the second bipolar transistor Q2 to the gate of first field-effect transistor M1 and switches on the first field-effect transistor M1. The voltage starts rising over the primary coil of the transformer T1 and the current is flowing through the resistor R4 and capacitor C2, which causes a higher voltage at the gate of first field-effect transistor M1. Additionally, the capacitor C4 is charging at the same time. The drain-source current of the first field-effect transistor M1 is maximum at this stage and causes an induction in the transformer T1. Within a few microseconds the transformer T1 reaches the saturation current and voltage starts to rise at the capacitor C5. Additionally, current starts flowing through the resistor R8, which controls the maximum current at the base of fourth bipolar transistor Q4. The fourth and fifth bipolar transistors Q4 and Q5 are in trigger circuit, because in case the fourth bipolar transistor Q4 switches on, the fifth bipolar transistor Q5 also switches on and therefore decreases the switching time of the trigger circuit. Additionally, the current flow through the resistor R10 applies to the base of sixth bipolar transistor Q6, which switches on the sixth bipolar transistor Q6. This current flow through the sixth bipolar transistor Q6 switches off the voltage at gate of first field-effect transistor M1, so that in case the trigger circuit is switched also the first field-effect transistor M1 is switched. At this stage the transformer T1 provides current to the secondary circuit, because of the still existing electric energy within the coils and because of the change of polarity within the coils of the transformer T1. The secondary circuit comprises a first bipolar transistor Q1, a third capacitor C3 and a regulation unit U1. In case the current flow from the transformer T1 terminates within the secondary circuit, a new pulse can be generated within the first circuit.

Figure 8:
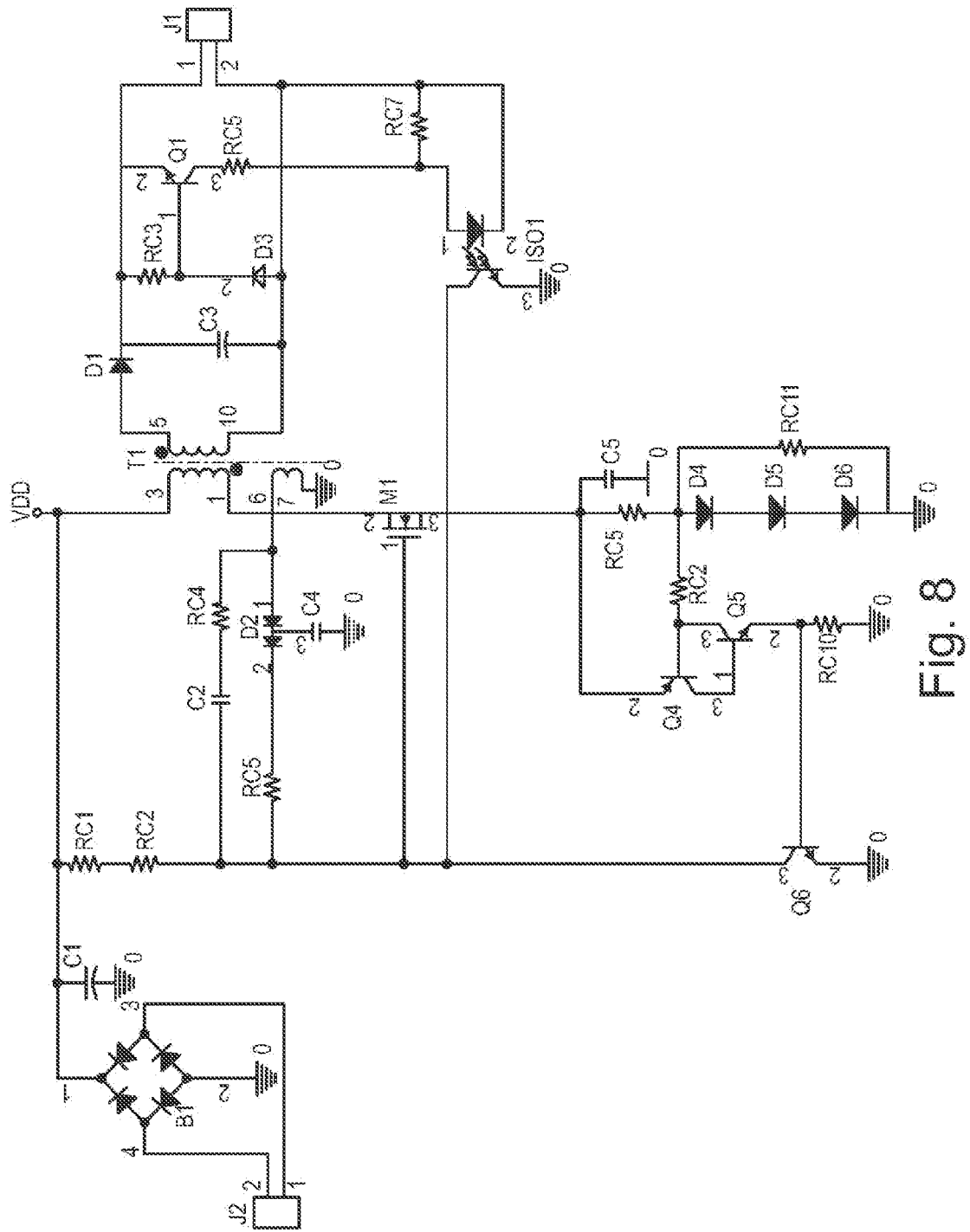
FIG. 8 shows a further embodiment for a switch mode power supply.

FIG. 8 shows a further embodiment of the invention which is similar to the fifth embodiment shown in FIG. 5 except that the push/pull circuit formed by the transistors Q2 and Q3 can be removed. The diodes D4, D5 and D6 can be replaced by a resistor RC11 or the resistor RC11 can be placed in parallel with the diodes D4, D5 and D6.

Figure 6:
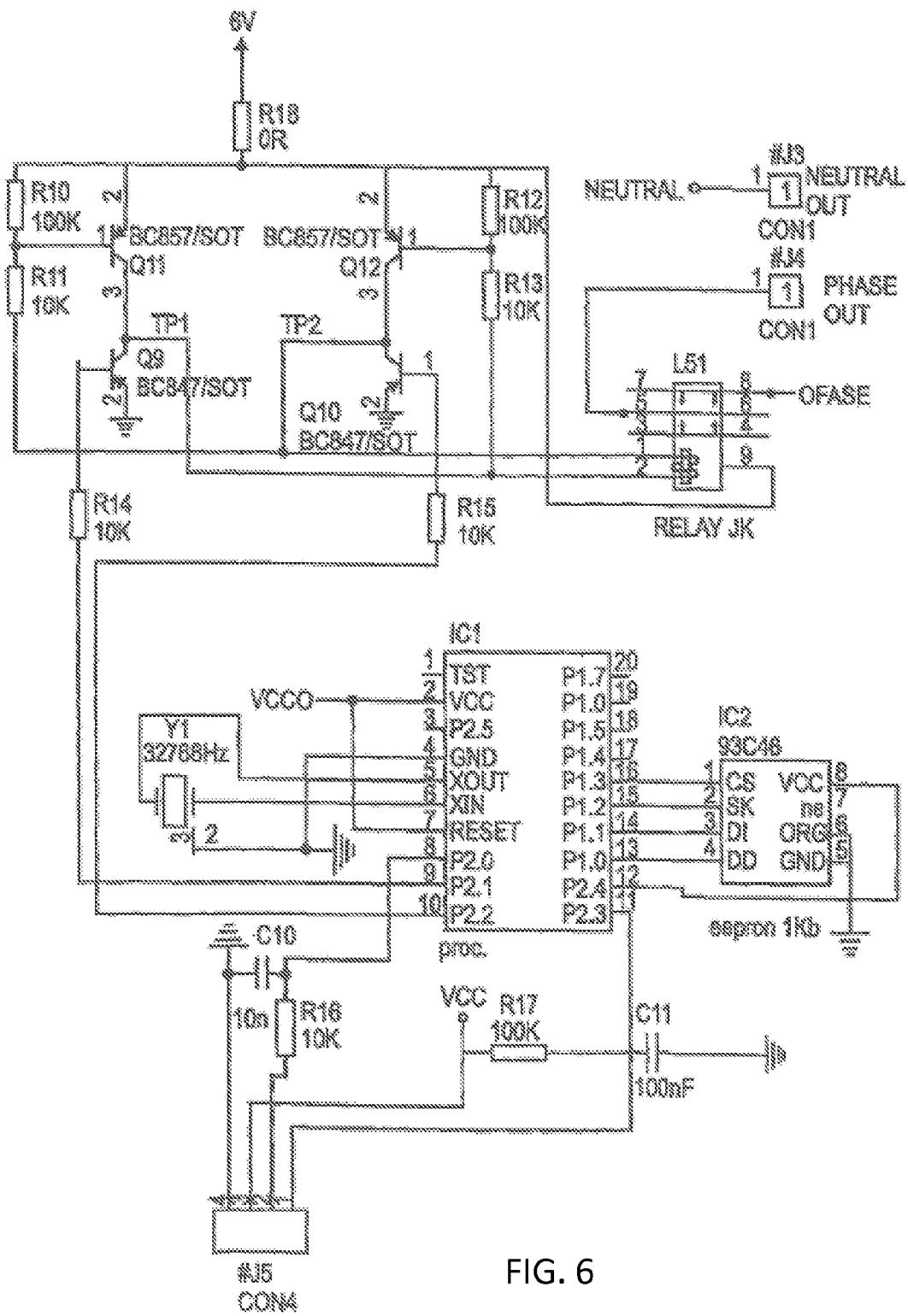
FIG. 6 shows a possible embodiment for a relay unit.

FIG. 6 shows the relay circuit which could be connected to the switch mode power supply as indicated in FIG. 1. The relay circuit comprises an electronic switching bridge in which bridge four bipolar transistors Q9, Q10, Q11, Q12 are forming legs and where the midpoint of the bridge both are connected to each side a relay coil in a bi-stable relay LS1. The first leg in the bridge is formed of two bipolar transistors Q11 and Q9. The base of the third bipolar transistor Q11 is connected to the positive power supply to a resistor R10 and through a second resistor R11 to one part of the relay coil. The other leg of the bridge is formed of the fourth bipolar transistor Q12 and the second bipolar transistor Q10. Furthermore, is the base of the fourth bipolar transistor Q12 connected to the positive power supply through a resistor R11 and through a resistor R13 to the opposite side of the relay coil. Both the first and second bipolar transistors Q9 and Q10 of the bridge have an emitter connected to the ground. The midpoint of the bridge is also a collector connection from both sides of the bridge. These midpoints are connected to each side of the relay coil. The relay coil is further over resistor R11 and R13 connected to the base of the third and fourth bipolar transistors Q11 and Q12. The base of both the first and second bipolar transistors Q9 and Q10 are by resistors R14 and R15 connected to a processor IC1. This processor IC1 is further connected to a memory IC2. The IC1 is also connected to a crystal Y1 for internal generating a clock frequency. The processor EC1 has an input lines connected to an input device which could be cable or other communication means for connection to any kind of input means.

Figure 7:
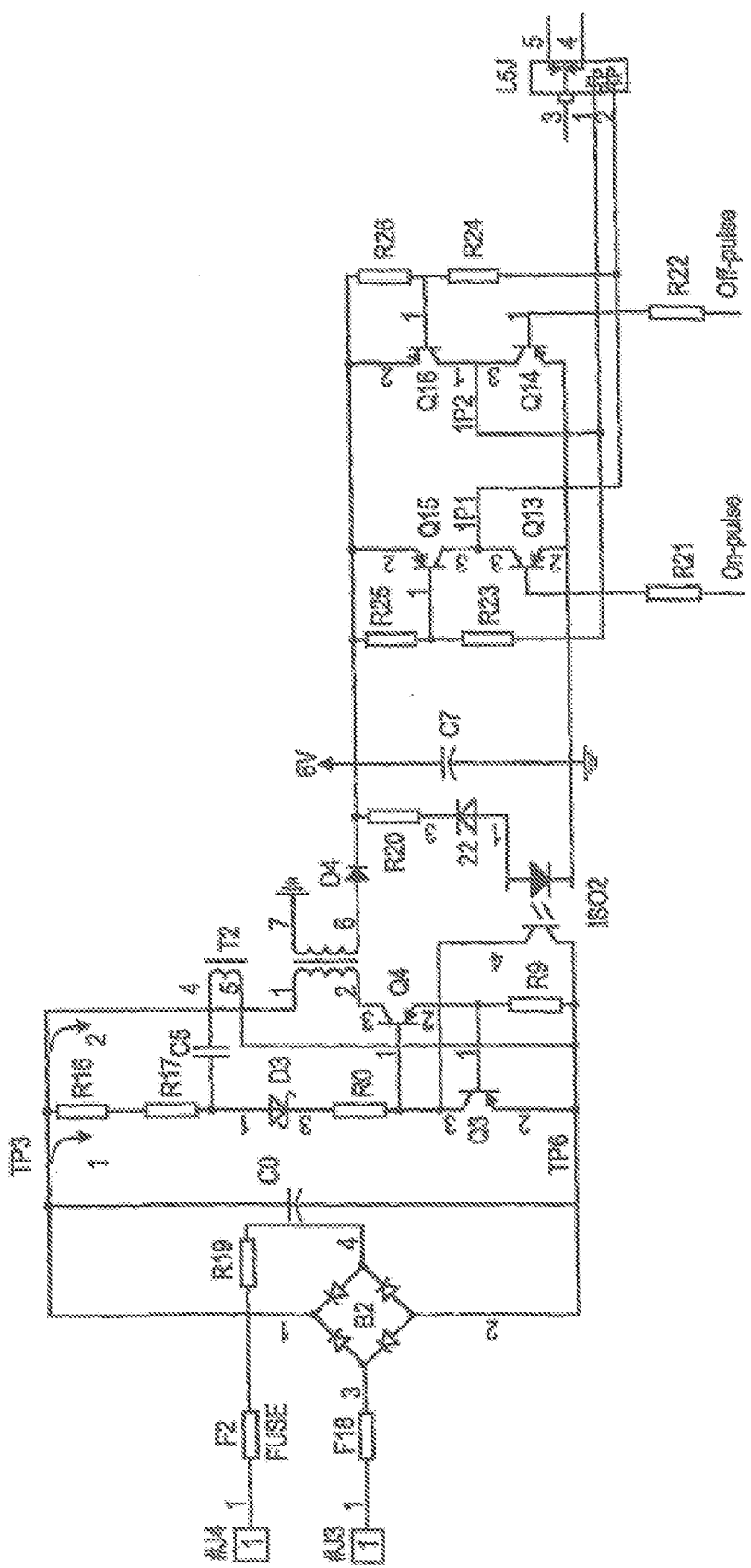
FIG. 7 shows a combination of FIGS. 1 and 6.

FIG. 7 shows a combination of FIGS. 1 and 6.

It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The invention claimed is:

1. A low power switch mode power supply comprising a primary oscillating circuit, which primary oscillating circuit is connected to a DC power source, which primary oscillating circuit is connected to a first primary coil of a transformer, which transformer comprises at least a first secondary coil, which secondary coil is connected through a rectifier to an output circuit, which output circuit comprises at least a first capacitor for forming a DC output voltage, the switch mode power supply further comprises a feedback circuit, which feedback circuit uses the actual output voltage for control of a primary switching circuit, characterized in that the feedback circuit comprises an opto coupler, which input LED of the opto coupler is connected through a current and voltage limiting circuit to the output voltage, which low power switch mode power supply comprises a first current loop in form of a voltage divider, which voltage divider is connected to the DC power source through at least one resistor, which first resistor is connected to a first terminal of a first transistor, which voltage divider is connected to a first terminal of a second transistor, having a second terminal and a third terminal connected to ground, which low power switch mode power supply further comprises a second current loop in form of the first primary coil of the transformer which a first end is connected to the DC power source and a second end of the first primary coil is connected to a second terminal of the first transistor, which second current loop further comprises a second resistor, which second resistor is connected to ground, which a third terminal of the first transistor is further connected to a first terminal of an output transistor of the opto coupler, which first terminal of the output transistor of the opto coupler is further connected to the first terminal of the second transistor, and a second terminal of the output transistor of the opto coupler is further connected to ground.

2. The low power switch mode power supply according to claim 1, characterized in that the transformer comprises a second primary coil, which second primary coil is at one end connected to ground, and the second end of the coil is connected to the voltage divider of the first current loop.

3. The low power switch mode power supply according to claim 1, characterized in that at least one of the transistors is a bipolar and/or a field-effect transistor.

4. The low power switch mode power supply according to claim 1, characterized in that the single switching sequence of the oscillator in standby situation is performed at a rate of up to once per second.

5. A system for operating the low power switch mode power supply of claim 1, wherein a low power relay unit is adapted to receive power for operation from the low power switch mode power supply, which low power relay unit comprises a bi-stable relay, which low power bi-stable relay has a coil connected to a control circuit, which control circuit comprises a first current loop and a second current loop, which first current loop and second current loop comprise two electronic switches for forming an electronic bridge, which coil of the low power relay unit is connected between the switches of the electronic bridge, where at least one electronic switch is connected to a processor, the processor being adapted to generate activation pulses for the electronic switches, which processor further is connected to an input device.

6. The system for operating a low power switch mode power supply according to claim 5, characterized in that the low power switch mode power supply is used to supply a relay unit, which relay unit is adapted to control the position of a bi-stable relay, which relay unit is adapted to change the position of the bi-stable relay based on an input signal.

7. The system for operating a low power switch mode power supply according to claim 5, characterized in that the relay unit is adapted to receive an input signal from a communication device.

8. The system for operating a low power switch mode power supply according to claim 5, characterized in that the power supply and the relay unit form part of the power supply in a power consuming device.

* * * * *